July 17, 1928.
C. L. BEAUREGARD
1,677,703
SAFETY DEVICE FOR MOTOR VEHICLES
Filed Feb. 16, 1927
2 Sheets-Sheet 1
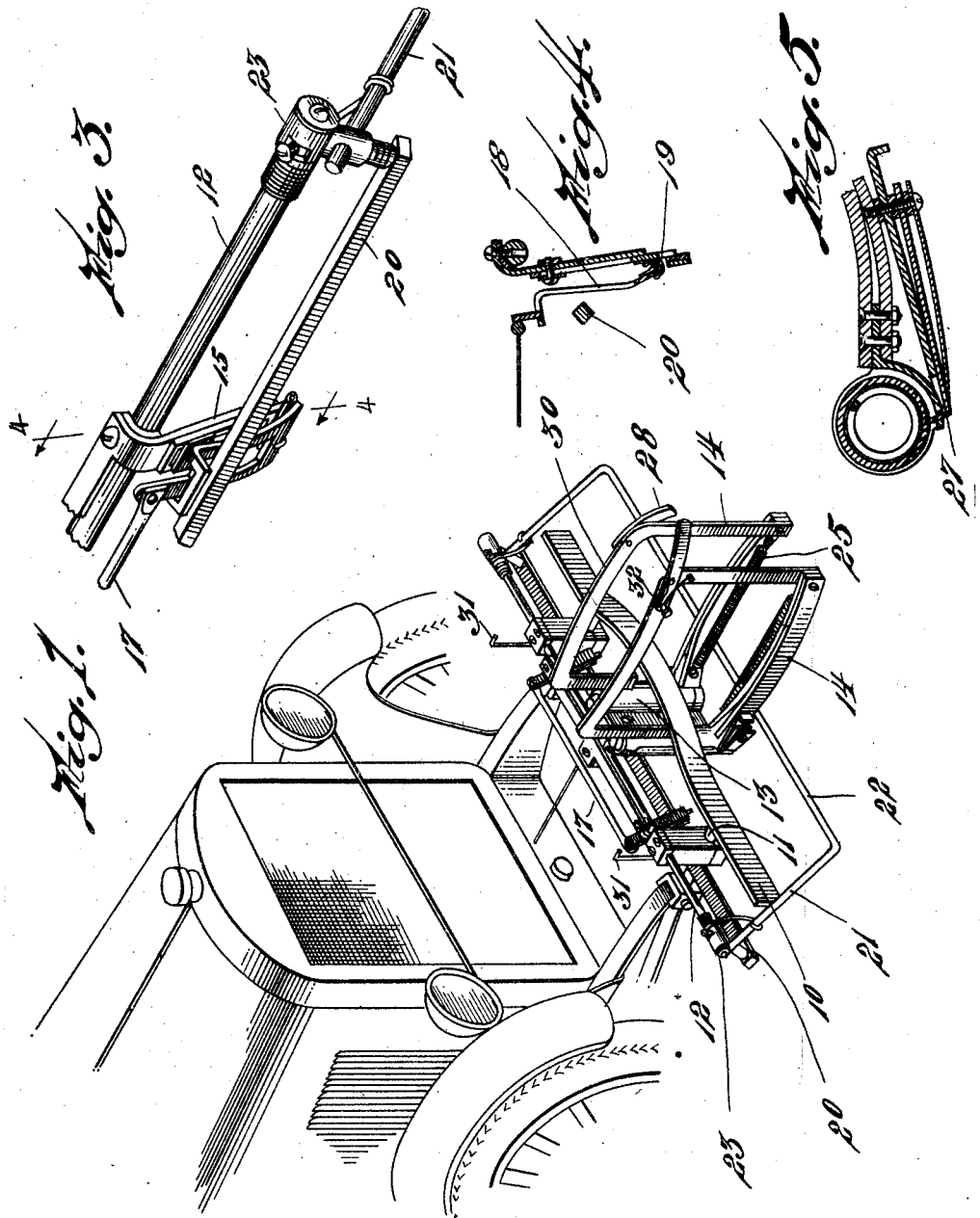
INVENTOR.
Charles L. Beauregard.
BY Barlow & Barlow
ATTORNEYS.

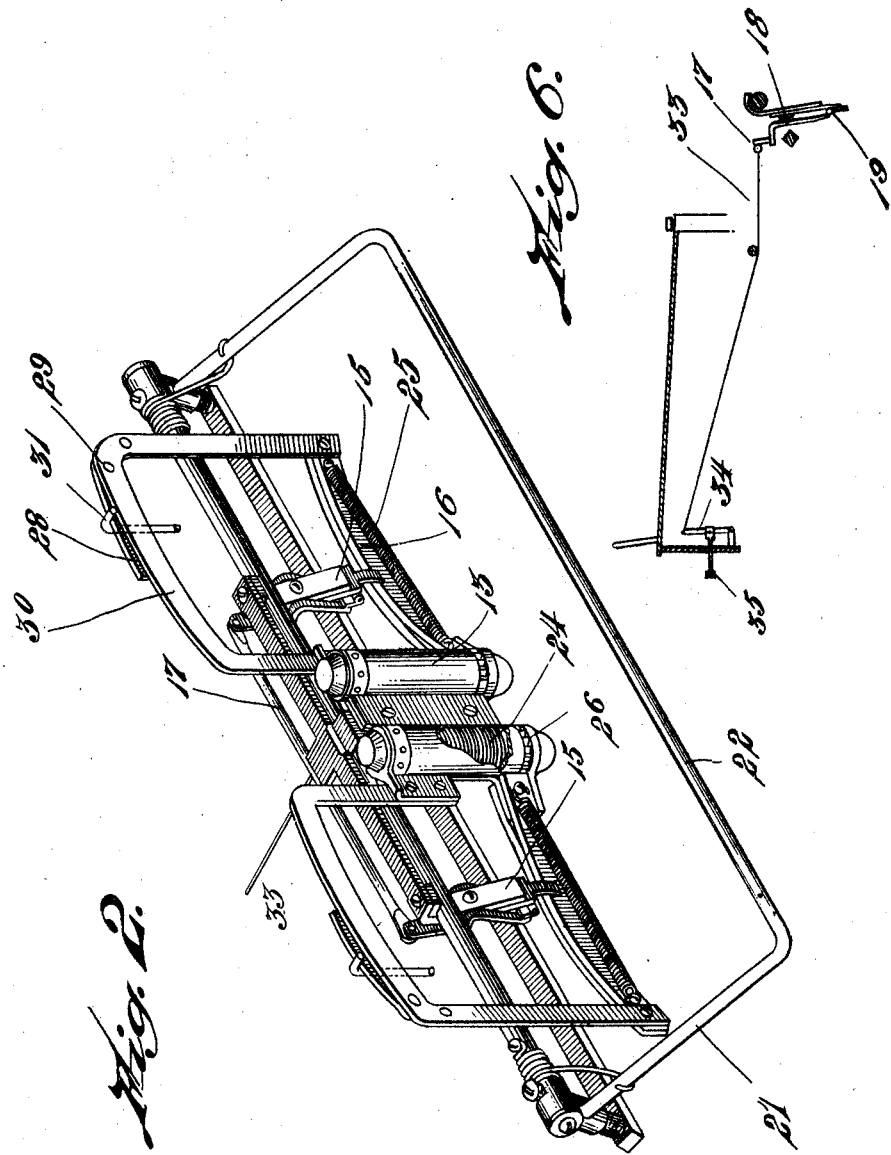

Patented July 17, 1928.

1,677,703

UNITED STATES PATENT OFFICE.

CHARLES L. BEAUREGARD, OF PROVIDENCE, RHODE ISLAND.

SAFETY DEVICE FOR MOTOR VEHICLES.

Application filed February 16, 1927. Serial No. 168,580.

This invention relates to a safety device for motor vehicles of the type adapted to be attached to the front of a motor vehicle to grab a person when struck by a vehicle to prevent his passing beneath the wheels; and has for its object to provide a trip mechanism for releasing the grappling arms with means for readily moving the trip mechanism to and from operating position from a point adjacent the seat of the driver of the motor vehicle.

A further object of the invention is to provide foldable arms on the grappling members which will extend to increase the effective scope of the members while the members are moving to gripping position to better grab a person at one side of the center of the vehicle.

A still further object of the invention is the provision of cushioning means for cushioning the force of the grappling members when engaging a person and at the same time conform to the shape of the person to tightly frictionally grip him, means being provided for preventing such resilient cushioning from causing the arms to rebound or open after they have moved into engagement with a person.

With these and other objects in view, the invention consists of certain novel features of construction, as will be more fully described, and particularly pointed out in the appended claims.

In the accompanying drawings:

Figure 1 is a perspective view of the forward portion of a motor vehicle showing my improved safety device attached thereto.

Figure 2 is a perspective view of the safety device in open position with its mounting removed.

Figure 3 is a perspective view of the fragmental detail showing the trip arm in position to release the retaining finger for holding the grappling member in open position.

Figure 4 is a section on line 4—4 of Figure 3, with the lip of the retaining finger moved to inoperative position.

Figure 5 is a fragmental section in detail showing the ratchet mechanism for preventing rebound of the grappling members.

Figure 6 is a diagrammatic view in section illustrating the push rod for moving the trip frame to and from operating position from the seat of the driver.

It is found with the growing number of motor vehicles in use that collisions of a motor vehicle with pedestrians are becoming more frequent and that the most serious accidents are occasioned by the wheel of the motor vehicle passing over the body of the person and in order to prevent such injury, I have provided a grappling device which may be compact in form and positioned to be folded largely behind the bumper on the forward end of the motor vehicle with grappling members to be tripped upon engagement with the pedestrian and moved to grab the pedestrian before he is thrown to the ground and before the wheel of the vehicle can pass over his body, with means for cushioning the blow of the grappling members upon engagement with the pedestrian to firmly and effectually grip him; and the following is a detailed description of the present embodiment of the invention showing one means by which these advantageous results may be accomplished:

With reference to the drawings, 10 designates the usual front bumper of a motor vehicle which is suitably mounted on brackets 11 secured to the vehicle framework. Upon these brackets 11 as a convenient place of attachment, I have mounted a supporting rod 12 which carries spaced hinge mountings 13 for the grappling members 14, with springs 24 within these mountings tending to move the members 14 from their open position, in Figure 2, toward their closed position, as illustrated in Figure 1. The members are held in their open position by retaining fingers 15 which extend over the lower portion 16 of the frame-like grappling members to hold them in their open position. These retaining fingers 15 are connected together by a suitable rod 17 and to their rear portion is pivotally mounted a lip member 18 which by means of spring 19 tends to move into position to be engaged by the bar 20 of the trip frame 21 which is pivotally mounted on the supporting rod 12. The frame has an engaging bar 22 extending in a position forwardly of the bumper and the grappling members to engage a pedestrian and swing the frame on its pivotal mounting at 23 to swing bar 20 rearwardly and upwardly into engagement with the lip member 18 to lift the same and the retaining fingers 15 from engagement with the lower portion 16 of the grappling members and permit them to swing from open position under influence of the springs 24 into engagement with the object causing the operation of the trip frame 22 to release the grappling members.

Each of these grappling members is formed on an arc of a circle and a coiled spring 25 extends as a cord across this arc to engage the person grabbed and cushion the blow of the arms which swing with considerable rapidity into closed position and in order to prevent these from rebounding after engaging a person, I have provided a ratchet 26 in the base of each of the hinge mountings 13 with a pawl 27 carried by the grappling members to engage this ratchet and prevent them from opening up to release the person after being gripped.

In order to increase the scope of swing through which the grappling members move to engage the person, I have provided expansion arms pivoted as at 29 to be folded along the top portion 30 of the grappling members and be held in such folded position by the hook 31, fixed to the supporting bar 12. As the grappling members are moved from beneath the hook 31 a spring 32 swings the extension arms 28 to their extended position, as illustrated in Figure 1.

It is often desirable in directing a motor vehicle in close spaces where the trip mechanism is apt to be accidently engaged, to provide a means to prevent the tripping mechanism from acting and causing the grappling members to release and move to closed position, which result I have accomplished by providing a flexible rod 33 which extends from the connecting rod 17 to a pivoted link 34 manually operated by a handle 35 to move the bar 17 with the lip members 18 on the pivots 19 so that a swinging of the trip mechanism frame will not engage the lips to lift the fingers from releasing position.

The foregoing description is directed solely towards the construction illustrated, but I desire it to be understood that I reserve the privilege of resorting to all the mechanical changes of which the device is susceptible, the invention being defined and limited only by the terms of the appended claims.

I claim:

1. A safety device for a motor vehicle comprising a pair of grappling members, means tending to move said members from open to closed position to grip the body of a person, fingers for retaining said members in open position, tripping mechanism for moving said fingers to release said members upon engagement with an object in front of the vehicle and means associated with said tripping mechanism and located to be operated from the position of the driver of the vehicle to render tripping mechanism inoperative upon engagement with an object or restore said mechanism to operative position.

2. A safety device for a motor vehicle comprising a pair of grappling members, hinge mountings for said members, resilient means tending to swing said members from open to closed position to grip the body of a person, fingers for retaining said members in inoperative open position against the action of said resilient means, a trip frame having a bar extending in front of said members, a pivotal mounting for said trip frame, lips extending from said fingers to be engaged by said frame upon its being swung on its pivots and a push rod extending to a remote position to move said lips out of the path of said frame.

3. A safety device for a motor vehicle comprising a pair of grappling members, means tending to move said members from open to closed position to grip the body of a person, fingers for retaining said members in open position, foldable extension arms on said members, means tending to move said arms to extend the effective swinging scope of said members, means for holding said arms in folded position when said members are in inoperative open position, and release them upon movement to closed grabbing position, and tripping mechanism for moving said fingers to release said members upon engagement with an object.

4. A safety device for a motor vehicle comprising a pair of arc-shaped grappling members, means for mounting said members to swing into position to grab a person, coiled springs extending as a cord across the arc of said members to conform to the shape of the person grabbed and cushion the force of engagement with the members.

5. A safety device for a motor vehicle comprising a pair of arc-shaped grappling members, means for mounting said members to swing into position to grab a person, coiled springs extending as a cord across the arc of said members to conform to the shape of the person grabbed and cushion the force of a blow by the members, and means for preventing a return movement of said arm after swinging to closed position.

6. A safety device for a motor vehicle comprising a pair of grappling members, means tending to move said member from open to closed position to grip the body of a person, means for retaining said members in open position, tripping mechanism for moving said means to release said members upon engagement with an object in front of the vehicle and means associated with said tripping mechanism and located to be operated from the position of the driver of the vehicle to render tripping mechanism inoperative upon engagement with an object or restore said mechanism to operative position.

7. A safety device for a motor vehicle comprising a pair of arc-shaped grappling members, means for mounting said members to swing into position to grab a person, pawl and ratchet mechanism associated with said means for mounting said members to permit the moving of said members toward each other and prevent their swinging apart.

In testimony whereof I affix my signature.

CHARLES L. BEAUREGARD.